United States Patent [19]

McMickle

[11] 4,234,998
[45] Nov. 25, 1980

[54] WIRE SNAP
[75] Inventor: Robert L. McMickle, Spirit Lake, Iowa
[73] Assignee: Berkley & Company, Spirit Lake, Iowa
[21] Appl. No.: 953,262
[22] Filed: Oct. 20, 1978

Related U.S. Application Data
[63] Continuation of Ser. No. 853,039, Nov. 21, 1977.

[51] Int. Cl.³ .............................................. A44B 21/00
[52] U.S. Cl. ...................................... 24/73 C; 24/237
[58] Field of Search ...................... 24/237, 73 C, 81 C; 43/43.1, 44.83

[56] References Cited
U.S. PATENT DOCUMENTS

| | | | |
|---|---|---|---|
| 1,196,514 | 8/1916 | Burgess | 24/73 C |
| 1,728,560 | 9/1929 | Goshorn | 24/237 |
| 1,998,035 | 4/1935 | Wiberg | 24/73 C |
| 2,240,693 | 5/1941 | Elnes | 24/81 C |

Primary Examiner—Kenneth Dorner
Attorney, Agent, or Firm—Schroeder, Siegfried, Ryan, Vidas, Steffey & Arrett

[57] ABSTRACT

The invention relates to a simplified wire snap formed of a bent piece of wire made of a high tensile steel material. The wire snap is formed by bending a length of wire at its extremities so that the bends face back toward one another and on a central body of the wire therebetween. The extremities of the bent wire have hooks therein and the hooks are directed in opposite directions with offsetting or angular bends therein to permit the wires to be readily bent and fit around the main body portion to secure to the same. The hook extremity of one bend portion overlies or extends beyond the hook extremity of the opposite bent portion to significantly increase the tensile strength of the wire snap.

2 Claims, 4 Drawing Figures

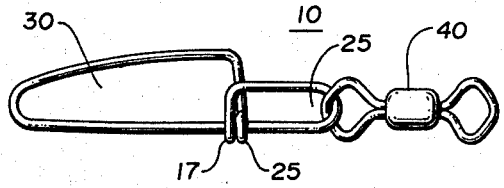
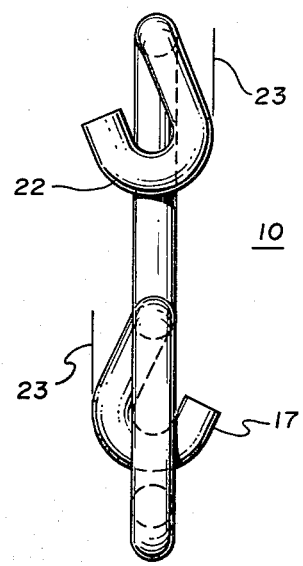
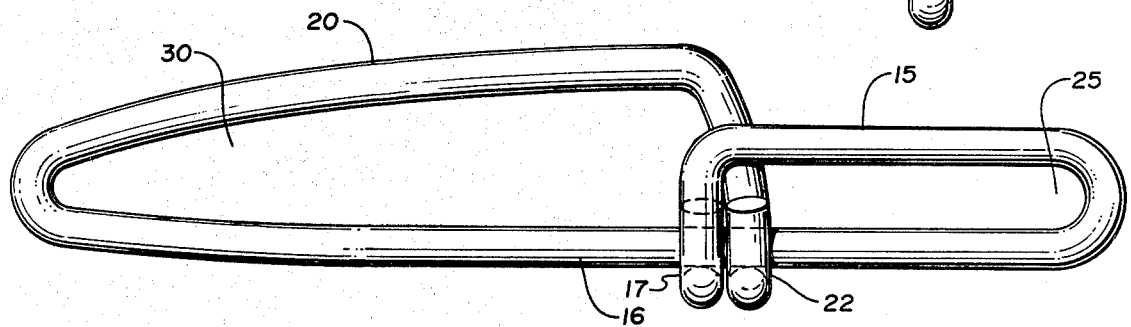
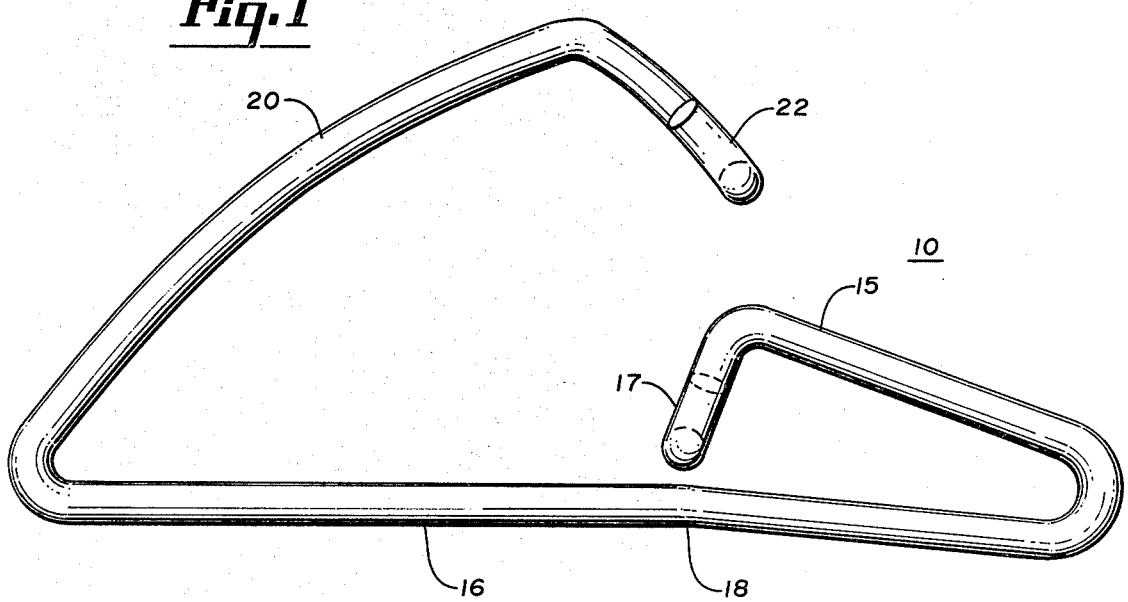

WIRE SNAP

This is a continuation of application Ser. No. 853,039, filed Nov. 21, 1977.

FIELD AND BACKGROUND OF INVENTION

My invention relates to a wire snap for connecting fishing leaders and lures to a fishing line and more particularly to an improved wire snap with a positive lock configuration for greater strength.

Wire snaps used in connection with fishing lures leaders, and fishing line are well known and in use and take a variety of forms. Normally, such wire snaps are a two piece unit incorporating a bent wire and a shield wrapped around the central portion of the bent wire and adapted to provide a connection or lock with the bent extremities to form the snap. The multiple parts and bending operation of the same increase the cost of the unit and generally such structures do not have significant strength for a desired size of the same. Still other snaps are formed of a single wire which is bent on itself to form a body portion with the bent extremities being interconnected to provide a hook or snap. Such units are relatively low in pulling strength. Still other snaps of this type incorporate a bent wire wrapped through one eyelet of a swivel with the opposite end being connected to the body through a snap connection. Such units are similarly of relatively poor pulling strength, and the multiple operations of combining the snap with the swivel increase the cost of the same.

SUMMARY OF PRESENT INVENTION

The improved wire snap of the present invention is formed of a single piece of wire which is preferably made of a high tensile steel for sufficient strength, such as a piano wire. The ends of the wire are bent to form a pair of loops adaptable for connecting a lure or leader to a barrel type swivel with the hook extremities of the bent wire forming the loops being interconnected upon themselves and the main body of the wire or central portion thereof to significantly increase the strength of the snap and to provide for ease in opening the snap. Further, the improved wire snap provides means for attaching a swivel thereto, if desired, and yet provides a relatively low cost wire snap for a variety of applications. Since the hook extremities of the bent wire overlap one another, any loading of the snap will tend to pull on both ends of the wire to bring them together and pull on one another as well as the central portion thereof to increase the load carrying capacity of the snap.

IN THE DRAWINGS

FIG. 1 is a side elvation view of the improved snap in enlarged view and with hook extremities open.

FIG. 2 is a right end elevation view of the snap of FIG. 1;

FIG. 3 is a side elevation view of the snap with the hook extremities in the closed position; and, FIG. 4 is a side elevation view of the snap in a closed position with a swivel attached thereto, showing the application of the same.

DESCRIPTION OF THE PREFERRED EMBODIMENT

My improved wire snap is shown generally at 10 in FIGS. 1, 2, and 3. It is comprised of a piece of wire having high tensile strength, such as steel wire, and of a given length having its ends bent as indicated at 15 and 20. The bent ends define a central body portion 16 having a slight bend 18 along the extent of the same, as will be best seen in FIG. 1. The bent ends 15 and 20 have bent hook extremities or tips indicated at 17 and 22, which hook extremities are generally symmetrical in shape being bent to basically the same radius and offset from the general extent of the bent portion through the same angular displacement, as indicated at 23, such that the hook extremities fit around the main body portion as will be best seen in FIGS. 3 and 4. The bent end 15 with its hook extremity 17 fits over the central body portion and hooks around the same generally in the location of the bend 18 to define a first loop 25 in the wire snap. Similarly, the bent end 20 with its hook extremity 22 fits around the main body portion 16 and overlies the hook extremity 17 for purposes to be hereinafter noted. When secured to the main body portion, it will define a second larger loop 30 for the wire snap. As shown in FIG. 3, the bend end 20, except for the hook tip 22, extends at an acute angle to the central body portion 16, and the bent end 15, except for the hook tip 17, extends substantially parallel to the central body portion 16 in a closed position of the wire snap forming the first and second loops. The length and width of the loop area 30 of the bent portion 20 of the wire snap is generally twice as large as the loop dimensions for the loop 25 formed by the bent wire portion 15. The hook portions 17 and 22 have the same radius of curvature which is slightly larger than the diametrical dimension of the wire such that it fits snugly around the central body portion, the hooks being directed in opposite directions so as to provide a relatively smooth surface area across the general outline of the snap. Similarly, the bent portions 15 and 20 of the wire snap in the closed and open position, except for the hook extremities 17 and 22 and the bent portions 23 thereof, generally fall in the same plane as the body portion 16 and the bend portions 23 allow for the hook extremities to overlap without displacing the bent portions 15 and 20 from this alignment in the same plane. The length of the bent portion 20 including its hook extremity is in the ratio of slightly greater than 2:1 to the length of the bent portion 15 and its hook extremity.

The smaller loop 25 in the wire snap provides a mounting for a swivel such as indicated at 40 in FIG. 4 and the same may be applied by opening the bent portion 15 and adding the swivel thereto. Thus, the swivel does not have to be permanently installed on the wire snap at the time of manufacture and may be used or omitted as desired. The overlap of the hook extremities increases significantly the strength of the wire snap in that the pulling force on the ends of the snap will tend to draw the hook extremities 17, 22 into contact with one another and the main body portion 16 significantly increasing the tensile strength of the wire snap. The larger loop of the wire snap may be utilized for attachment of the lure or leader as desired.

The improved wire snap is made from a single piece of wire without requirement of additional parts and with generally symmetrical bends in the same to provide a simplified wire snap which is relatively low in cost. When the snap is made of a high tensile steel wire, it provides a wire snap having exceptional tensile strength. It may be readily opened or unsnapped for attachment of a lure or leader to the larger loop extremity and, if desired, the smaller loop may be opened to permit the mounting of a swivel thereon.

In considering this invention it should be remembered that the present disclosure is illustrative only and the scope of the invention should be determined by the appended claims.

What I claim is:

1. A wire snap comprising: a single length of tensile steel wire with the ends bent back toward one another defining a central body portion therebetween, one end being bent back toward the central body portion and defining a first loop therewith and with the extremity of said end having a transverse hook tip adapted to fit around and secure said end to the central body portion and the other end being bent toward the central body portion defining a second loop therewith and having a transverse hook tip adapted to fit around and secure the other end to the central body portion, each of said transverse hook tips of said one and said other ends of said wire being bent toward one another and extending respectively beyond the transverse hook tip of the opposite end of said wire and fitting around the central body portion in an opposite direction with its hook tip being disposed adjacent that of the other and having the same radius of curvature, the bent end of the wire forming the first loop with the central portion being substantially parallel with the central body portion except for the hook tip and the bent end of the wire forming the second loop with the central body portion extending at an acute angle away from the central body portion along substantially a straight line to a point adjacent its hook tip, said first loop having a length dimension relative to the second loop each in the radio of 1:2 with said bent ends of said wire being positioned in the same plane as the central body portion except for the hook tips.

2. A wire snap comprising: a single length of tensile steel wire with the ends bent back toward one another and defining a central body portion therebetween, one end portion being bent back toward the central body portion and extending parallel thereto and defining a first loop therewith with the extremity of said end having a transverse hook tip adapted to fit around and secure said end to the central body portion, and the other end portion being bent back toward the central body portion and extending away therefrom at an acute angle thereto along substantially a straight line to to a point adjacent said hook tip and defining a second loop therewith and having a transverse hook tip adapted to fit around and secure the other end to the central body portion, said transverse hook tips of said ends of said wire being each bent toward one another and extending respectively beyond the transverse hook tip of the opposite end of said wire and fitting around the central body portion in an opposite direction with its hook tip being disposed adjacent that of the other, each of said bend ends extending throughout its length in the same plane as said central body portion except for said hook tips.

* * * * *

UNITED STATES PATENT AND TRADEMARK OFFICE
CERTIFICATE OF CORRECTION

PATENT NO. : 4,234,998
DATED : November 25, 1980
INVENTOR(S) : Robert L. McMickle It is certified that error appears in the above–identified patent and that said Letters Patent are hereby corrected as shown below:

In the Abstract, line 11, "bend" should be --bent--.

Column 1, line 54, "elvation" should be --elevation--.

Column 2, line 20, "bend" should be --bent--.

Column 2, line 38, "bend" should be --bent--.

Column 4, line 26, "bend" should be --bent--.

Signed and Sealed this

Third Day of March 1981

[SEAL]

Attest:

RENE D. TEGTMEYER

Attesting Officer    Acting Commissioner of Patents and Trademarks